(12) United States Patent
Fang et al.

(10) Patent No.: US 12,235,487 B1
(45) Date of Patent: Feb. 25, 2025

(54) BACKLIGHT MODULE

(71) Applicant: InnoLux Corporation, Miao-Li County (TW)

(72) Inventors: Chi Fang, Miao-Li County (TW); Wei-Tsung Hsu, Miao-Li County (TW)

(73) Assignee: INNOLUX CORPORATION, Chu-Nan (TW)

( * ) Notice: Subject to any disclaimer, the term of this patent is extended or adjusted under 35 U.S.C. 154(b) by 0 days.

(21) Appl. No.: 18/774,081

(22) Filed: Jul. 16, 2024

(30) Foreign Application Priority Data

Aug. 16, 2023 (CN) .......................... 202311029743.7

(51) Int. Cl.
*F21V 8/00* (2006.01)
(52) U.S. Cl.
CPC ......... *G02B 6/0051* (2013.01); *G02B 6/0053* (2013.01); *G02B 6/0088* (2013.01)
(58) Field of Classification Search
CPC ... G02B 6/0051; G02B 6/0053; G02B 6/0088
See application file for complete search history.

(56) References Cited

U.S. PATENT DOCUMENTS

2015/0300593 A1\* 10/2015 Chen ...................... G02B 19/00
362/331

FOREIGN PATENT DOCUMENTS

| CN | 110879495 A | 3/2020 |
|---|---|---|
| CN | 115602047 A | 1/2023 |

\* cited by examiner

*Primary Examiner* — Joseph L Williams
(74) *Attorney, Agent, or Firm* — Muncy, Geissler, Olds & Lowe, P.C.

(57) ABSTRACT

A backlight module includes a back plate, a light source disposed on the back plate, and a first optical film disposed on the back plate. The first optical film includes a first upper surface and a first lower surface, and the first upper surface is farther away from the back plate than the first lower surface, and has a first prism structure, wherein, at a first angle, a second angle and a third angle, the backlight module respectively has a first brightness value, a second brightness value and a third brightness value, which satisfy:

$|[(A/C)-(B/C)] \times 100\%| \geq 10\%$, where A, B and C represents the first, second and third brightness values, respectively, the third brightness value is the maximum brightness value of the backlight module, and the first, second and third angles are different from each other.

20 Claims, 7 Drawing Sheets

BACKLIGHT MODULE

CROSS-REFERENCE TO RELATED APPLICATIONS

This application claims the benefits of the Chinese Patent Application Serial Number 202311029743.7, filed on Aug. 16, 2023, the subject matter of which is incorporated herein by reference.

BACKGROUND

Field of Disclosure

The present disclosure relates to a backlight module and, more particularly, to a backlight module including a specially designed optical film.

Description of Related Art

With the rapid advancement of liquid crystal display (LCD) manufacturing technology and its advantages of being thin, light, power-saving, and free of radiation, LCDs are widely used in various electronic products such as tablet computers, notebook computers, digital cameras, digital video recorders, mobile phones, computer monitors and LCD TVs. The liquid crystal displays require backlight modules to provide light sources to display images.

However, current backlight modules still have shortcomings such as low brightness contrast, narrow viewing angle, and poor light output efficiency. Therefore, there is a need to provide an improved backlight module to alleviate and/or obviate the above defects.

SUMMARY

The present disclosure provides a backlight module, which includes: a back plate; a light source disposed on the back plate; and a first optical film disposed on the back plate, wherein the first optical film includes a first upper surface and a first lower surface, and the first upper surface is farther away from the back plate than the first lower surface, and has a first prism structure, wherein, at a first angle, a second angle and a third angle, the backlight module respectively has a first brightness value, a second brightness value and a third brightness value, which satisfy:

$$|[(A/C)-(B/C)] \times 100\%| \geq 10\%,$$

where A represents the first brightness value, B represents the second brightness value, C represents the third brightness value, the third brightness value is a maximum brightness value of the backlight module, and the first angle, the second angle and the third angle are different from each other.

Other novel features of the disclosure will become more apparent from the following detailed description when taken in conjunction with the accompanying drawings.

DETAILED DESCRIPTION OF EMBODIMENT

The implementation of the present disclosure is illustrated by specific embodiments to enable persons skilled in the art to easily understand the other advantages and effects of the present disclosure by referring to the disclosure contained therein. The present disclosure is implemented or applied by other different, specific embodiments. Various modifications and changes can be made in accordance with different viewpoints and applications to details disclosed herein without departing from the spirit of the present disclosure.

It should be noted that, in the specification and claims, unless otherwise specified, having "one" element is not limited to having a single said element, but one or more said elements may be provided. Furthermore, in the specification and claims, unless otherwise specified, ordinal numbers, such as "first", "second", etc., used herein are intended to distinguish elements rather than disclose explicitly or implicitly that names of the elements bear the wording of the ordinal numbers. The ordinal numbers do not imply what order an element and another element are in terms of space, time or steps of a manufacturing method.

In the entire specification and the appended claims of the present disclosure, certain words are used to refer to specific components. Those skilled in the art should understand that electronic device manufacturers may refer to the same components by different names. The present disclosure does not intend to distinguish those components with the same function but different names. In the claims and the following description, the words "comprise", "include" and "have" are open type language, and thus they should be interpreted as meaning "including but not limited to". Therefore, when the terms "comprise", "include" and/or "have" are used in the description of the present disclosure, they specify the existence of corresponding features, regions, steps, operations and/or components, but do not exclude the existence of one or more corresponding features, regions, steps, operations and/or components.

In the description, the terms "almost", "about", "approximately" or "substantially" usually means within 10%, 5%, 3%, 2%, 1% or 0.5% of a given value or range. The quantity given here is an approximate quantity; that is, without specifying "almost", "about", "approximately" or "substantially", it can still imply the meaning of "almost", "about", "approximately" or "substantially". In addition, the term "range of the first value to the second value" or "range between the first value and the second value" indicates that the range includes the first value, the second value, and other values in between.

Unless otherwise defined, all terms (including technical and scientific terms) used here have the same meanings as commonly understood by those skilled in the art of the present disclosure. It is understandable that these terms, such as those defined in commonly used dictionaries, should be interpreted as having a meaning consistent with the relevant technology and the background or context of the present disclosure, rather than in an idealized or excessively formal interpretation, unless specifically defined.

In addition, relative terms such as "below" or "bottom", and "above" or "top" may be used in the embodiments to describe the relationship between one component and another component in the drawing. It can be understood that, if the device in the drawing is turned upside down, the components described on the "lower" side will become the components on the "upper" side. When the corresponding member (such as a film or region) is described as "on another member", it may be directly on the other member, or there may be other members between the two members. On the other hand, when a member is described as "directly on another member", there is no member between the two members. In addition, when a member is described as "on another member", the two members have a vertical relationship in the top view direction, and this member may be above or below the other member, while the vertical relationship depends on the orientation of the device.

In the present disclosure, the angle may be measured by using an optical microscope, and the angle may be measured by cross-sectional images in an electron microscope, but the present disclosure is not limited thereto. In addition, any two values or directions used for comparison may have certain errors. If the first value is equal to the second value, it implies that there may be an error of about 10% between the first value and the second value. If the first direction is perpendicular to the second direction, it implies that the angle between the first direction and the second direction may be between 80 degrees and 100 degrees. If the first direction is parallel to the second direction, it implies that the angle between the first direction and the second direction may be between 0 degrees and 10 degrees.

It should be noted that the technical solutions provided by the different embodiments described hereinafter may be used interchangeably, combined or mixed to form another embodiment without violating the spirit of the present disclosure.

Figure 1A:
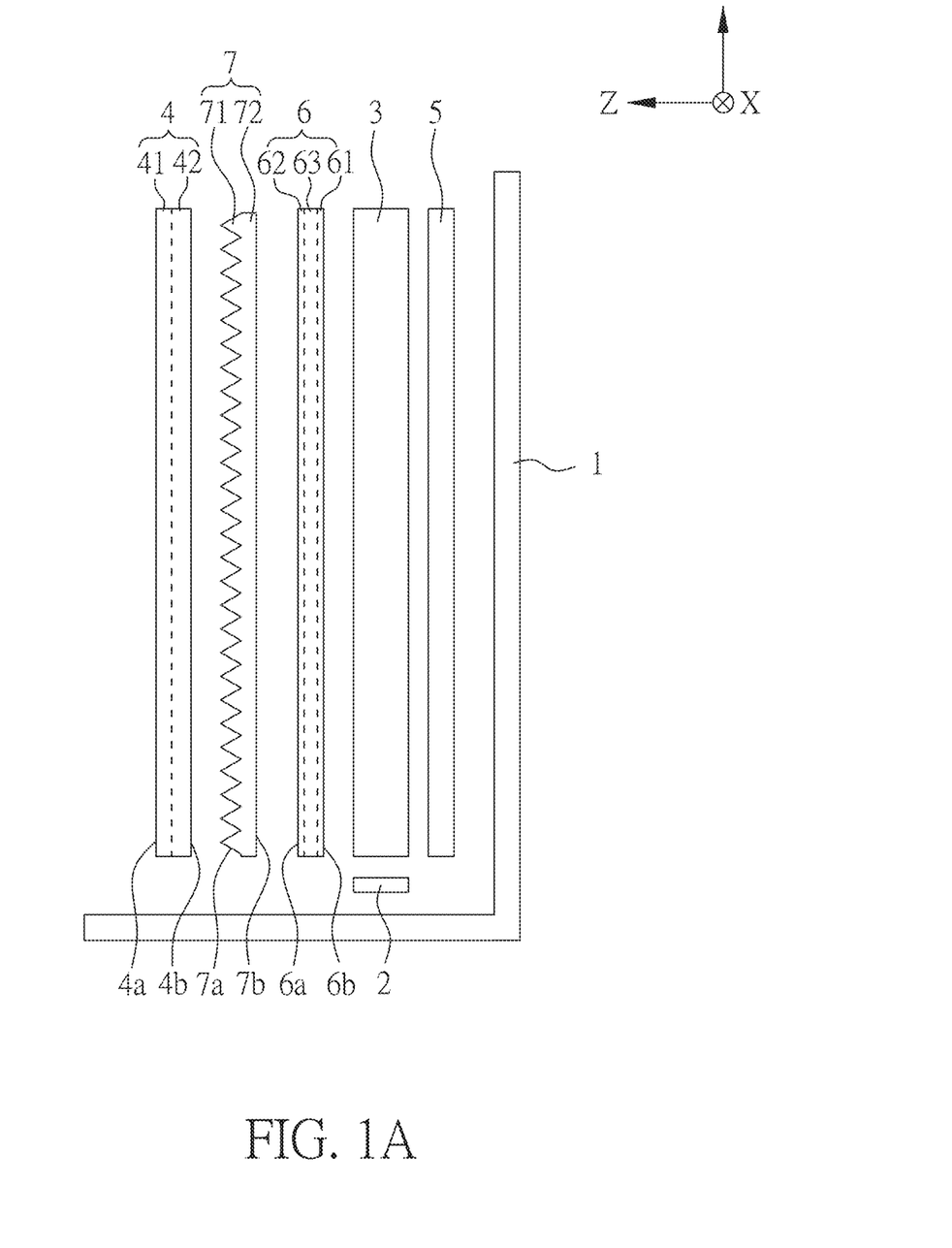
FIG. 1A is a schematic cross-sectional view of a backlight module according to an embodiment of the present disclosure.
Figure 1B:
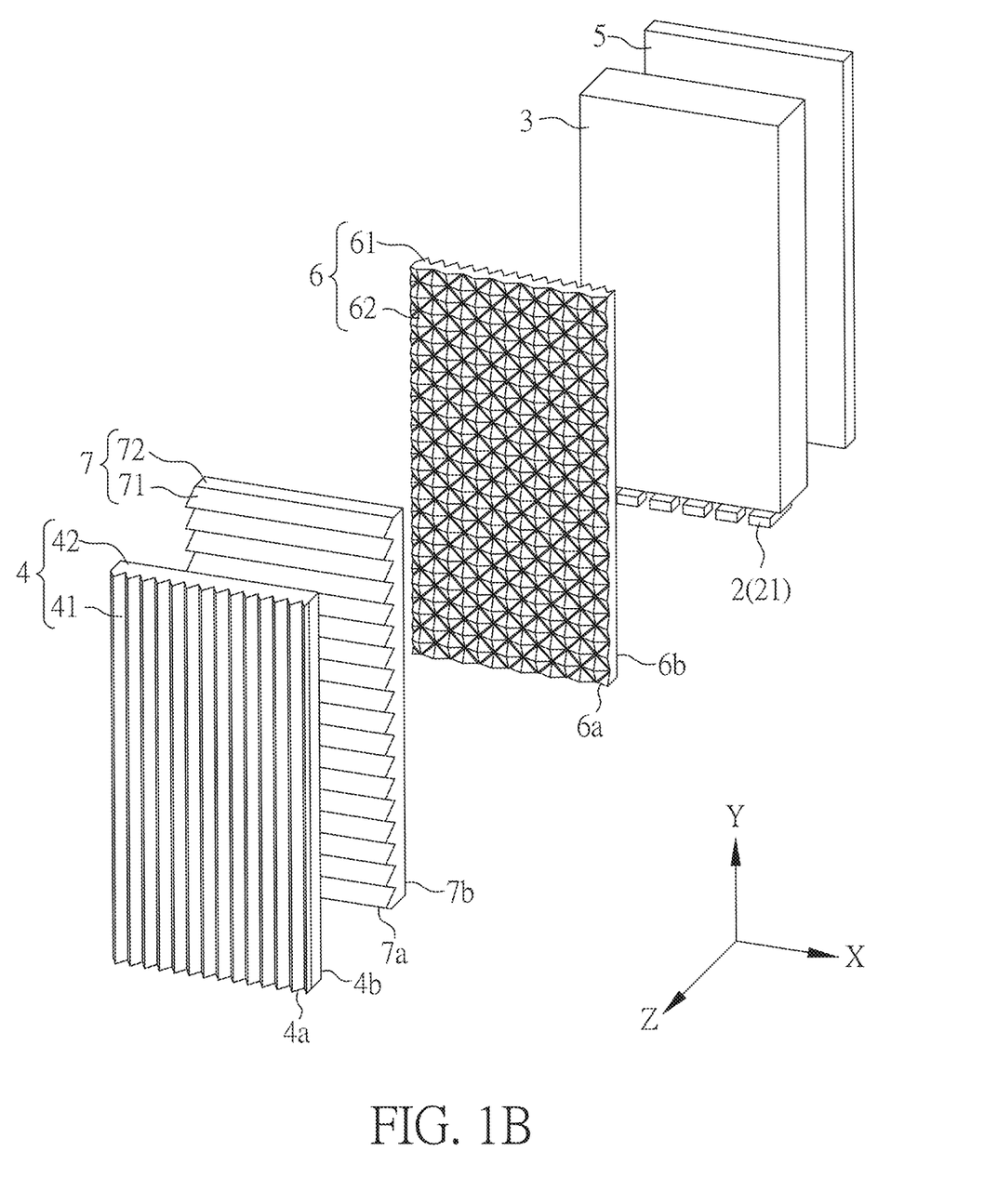
FIG. 1B is a schematic three-dimensional view of a backlight module according to an embodiment of the present disclosure.

FIG. 1A is a schematic cross-sectional view of a backlight module according to an embodiment of the present disclosure, and FIG. 1B is a schematic three-dimensional view of a backlight module opposite to an embodiment of the present disclosure, in which, for convenience of explanation, part of the structure is omitted in FIG. 1B.

In one embodiment of the present disclosure, as shown in FIG. 1A and FIG. 1B, the backlight module may include: a back plate 1; a light source 2, disposed on the back plate 1; and a light guide plate 3, disposed on the back plate 1 and disposed corresponding to the light source 2; and a first optical film 4 disposed on the back plate 1. Through the arrangement of the first optical film 4, the present disclosure may increase the brightness contrast of the backlight module, increase the amount of light output, or expand the light viewing angle, thereby achieving the advantages of increasing the light output efficiency of the backlight module or improving visual effects.

In the present disclosure, the material of the back plate 1 may include metal, alloy, polycarbonate (PC), polyimide (PI), polypropylene (PP), polyethylene terephthalate (PET) or other plastic or polymer materials, or a combination of the above, but the present disclosure is not limited thereto. In the present disclosure, the light source 2 may include a plurality of light emitting elements 21, and the plurality of light emitting elements 21 may be arranged along a first direction X, for example. In some embodiments, the light source 2 may include a light emitting diode, and the light emitting diode may include, for example, an organic light emitting diode (OLED), a sub-millimeter light emitting diode (mini LED), a micro light emitting diode (micro LED), a quantum dot light emitting diode (quantum dot LED, which may include QLED, QDLED), fluorescence, phosphor or other suitable materials, or a combination of the above, but the present disclosure is not limited thereto.

The detailed structure of the first optical film 4 will be introduced in detail below.

Figure 2A:
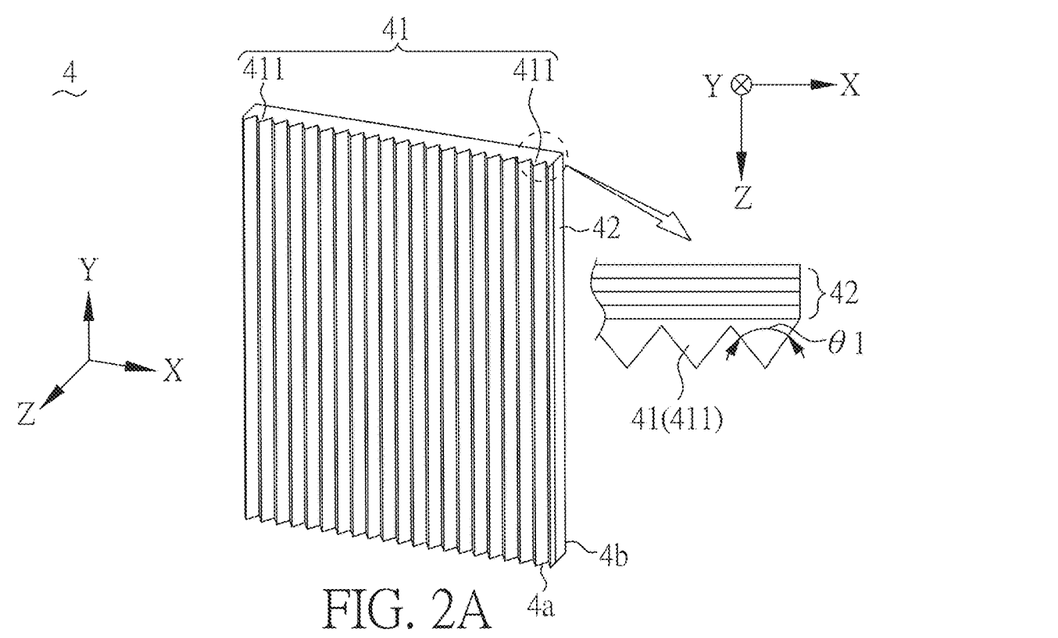
FIG. 2A is a schematic diagram of a first optical film according to an embodiment of the present disclosure.

FIG. 2A is a schematic diagram of a first optical film according to an embodiment of the present disclosure.

In one embodiment of the present disclosure, as shown in FIG. 1A, FIG. 1B and FIG. 2A, the first optical film 4 includes a first upper surface 4a and a first lower surface 4b opposite to the first upper surface 4a, wherein the first upper surface 4a is farther away from the back plate 1 than the first lower surface 4b (for example, far away from the side of the back plate 1 parallel to the surface of the first optical film 4), and the first upper surface 4a has a first prism structure 41. The extending direction of the first prism structure 41 may be, for example, perpendicular to the first direction X. More specifically, the first prism structure 41 may have a plurality of first strip structures 411, and the plurality of first strip structures 411 may be arranged along the first direction X. The "extending direction of the first prism structure 41" refers to the extending direction of the first strip structure 411 (for example, the second direction Y). The "perpendicular" means that the included angle between the extending direction of the prism structure and the first direction X may be 80 degrees to 100 degrees (80°≤included angle≤100°). In one embodiment of the present disclosure, the first prism structure 41 has a first vertex angle θ1, and the first vertex angle θ1 may be 70 degrees to 110 degrees (70°≤θ1≤110°). For example, the first vertex angle θ1 may be 70°, 80°, 90°, 100°, 110°, or any value between the aforementioned values or a range of values consisting of any values thereof.

In one embodiment of the present disclosure, as shown in FIG. 2A, the first optical film 4 includes a substrate 42, the substrate 42 has a multi-layer film structure, and the first prism structure 41 is disposed on the multi-layer film structure. In more detail, the multi-layer film structure may be composed of N layers of films that do not have one single refractive index (N is a positive integer greater than 2). For example, the multi-layer film structure may be stacked by multiple layers of films with alternating refractive indexes, and the first prism structure 41 may be directly disposed on the multi-layer film structure. Through the design of the multi-layer film structure, the substrate 42 of the first optical film 4 may be used to reflect the polarized light provided by the light source 2 (as shown in FIG. 1A), thereby increasing the amount of light output of the backlight module.

In the present disclosure, a CA410 color analyzer is used to perform brightness tests on the backlight module at different angles, and it is found that, at a first angle, a second angle and a third angle, the backlight module respectively has a first brightness value A, a second brightness value B and a third brightness value C, which satisfy the following equation (1):

$$|[(A/C)-(B/C)]\times 100\%|\geq 10\%, \quad (1)$$

wherein the third brightness value C is the maximum brightness value of the backlight module, and the first angle, the second angle and the third angle are different from each other. Therefore, the backlight module of the present disclosure is advantageous in having a larger polarization state or high brightness contrast, so as to improve the light output efficiency of the backlight module. In one embodiment of the present disclosure, the value of $|[(A/C)-(B/C)]\times 100\%|$ may be greater than or equal to 20% (that is, ≥20%), for example, greater than or equal to 30% (that is, ≥30%), greater than or equal to 40% (that is, ≥40%), greater than or equal to 50% (that is, ≥50%), greater than or equal to 60% (that is, ≥60%), greater than or equal to 70% (that is, ≥70%), greater than or equal to 80% (that is, ≥80%), but the present disclosure is not limited thereto.

The following describes the method of measuring the backlight module with the CA410 color analyzer.

Figure 7:
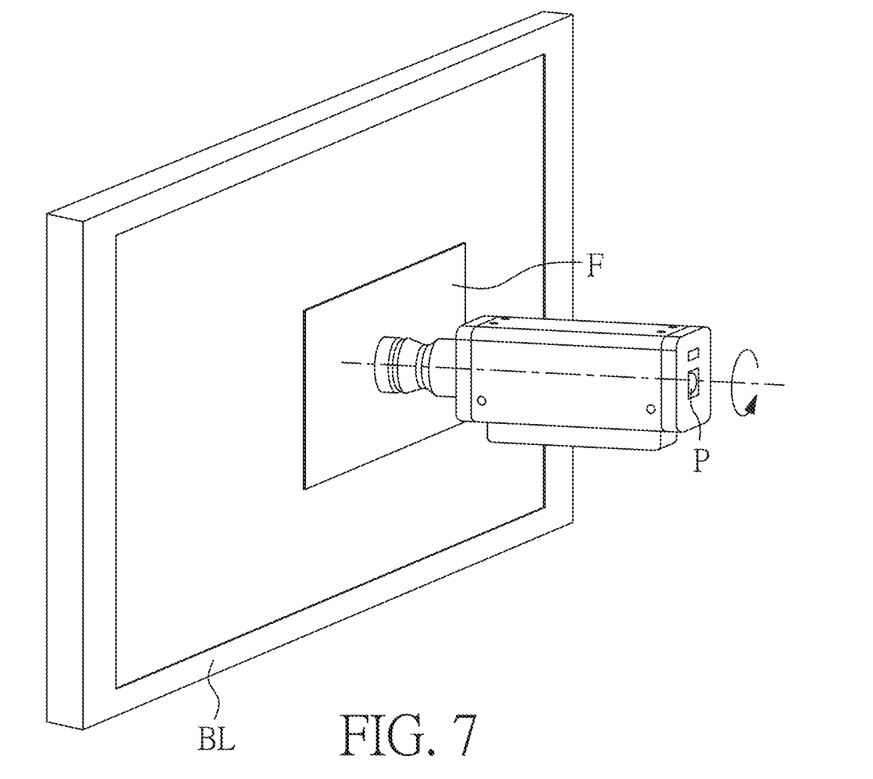
FIG. 7 is a schematic diagram illustrating a brightness measurement of a backlight module according to an embodiment of the present disclosure.

First, a polarizer F is fixed on a probe P of the CA410 color analyzer. More specifically, as shown in FIG. 7, the polarizer F is parallel to the backlight module BL to be measured, and is disposed between the probe P and the backlight module BL. Next, the probe P is perpendicular to the backlight module BL in preparation for measurement. The "probe is perpendicular to the backlight module" may, for example, refer to disposing the probe P along the normal direction Z of the backlight module BL. After that, the probe P and the polarizer F are rotated and the brightness value of the backlight module BL is measured. The starting position of the probe P is defined as 0 degrees, and one rotation of the probe P is defined as 360 degrees. The "first angle, second angle and third angle" are the angles at which the probe P rotates, and the "first brightness value, the second brightness value and the third brightness value" are the brightness of the backlight module BL measured by the probe P at the corresponding rotation angle (such as the first angle, the second angle and the third angle). It should be noted that, as shown in FIG. 7, there should be as little as possible a gap between the probe P and the polarizer F, and there should be as little as possible a gap between the polarizer F and the backlight module BL, so as to reduce the impact of ambient light on the measurement results. In another measurement method, if there is a gap between the probe P and the polarizer F, a light shield (not shown) may be disposed between the probe P and the polarizer F to reduce the impact of ambient light on the measurement results.

Figure 8:
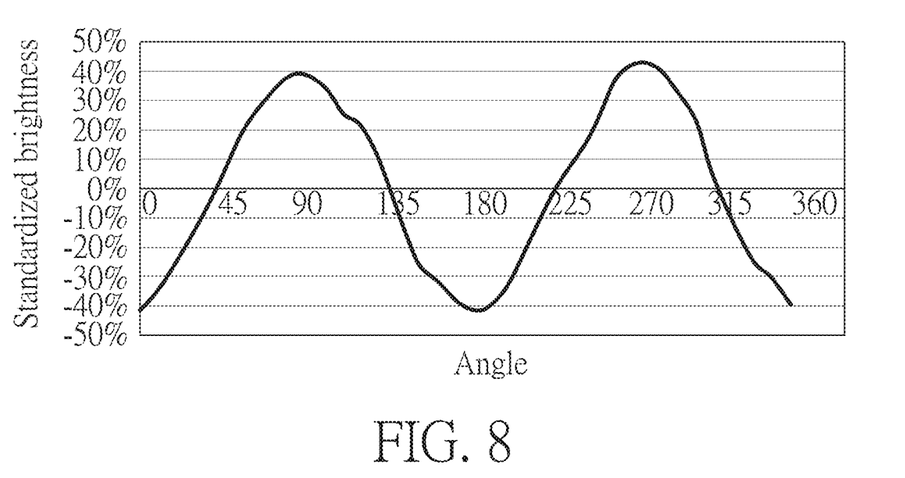
FIG. 8 illustrates a brightness measurement result of a backlight module according to an embodiment of the present disclosure.

Using the above method to measure the brightness of the backlight module of FIG. 1A as an example, the measurement results of FIG. 8 may be obtained after standardizing the brightness values measured at each rotation angle. The standardization formula may be: (measured brightness value/maximum brightness value)×100%. From FIG. 8, it can be found that, when rotating the probe about 90 degrees or 270 degrees, the backlight module will have the maximum brightness value and, when rotating the probe about 0 degrees, 180 degrees or 360 degrees, the backlight module will have the minimum brightness value. In addition, from the measurement results, it can also be found that the difference in polarization performance of the backlight module in FIG. 1A may reach about 80%. In other words, the brightness contrast of the backlight module in FIG. 1A may reach up to about 80%. Therefore, the backlight module of the present disclosure is advantageous in having larger polarization state or high brightness contrast.

In the present disclosure, the material of the first optical film 4 may include polycarbonate (PC), polyimide (PI), polyethylene terephthalate (PET), polyether polyol (POP), polymethylmethacrylate (PMMA), cycloolefin polymer (COP), rubber, glass, ultraviolet curing glue (UV glue), optical clear adhesive (OCA), optical clear resin (OCR), acrylic resin, other suitable materials or a combination thereof, but the present disclosure is not limited thereto. In one embodiment of the present disclosure, the material of the first prism structure 41 may be UV glue, and the material of the substrate 42 may be PET. However, the present disclosure is not limited thereto.

In one embodiment of the present disclosure, as shown in FIG. 1A and FIG. 1B, the backlight module may include a reflective element 5 disposed on the back plate 1. More specifically, the reflective element 5 may be disposed on the light guide plate 3 and the back plate 1, and may be used to reflect the light provided by the light source 2, thereby improving light utilization or reducing light leakage. In the present disclosure, the material of the reflective element 5 is not particularly limited, and may include, for example, metal, white ink, white tape, other reflective materials, or a combination thereof. The metal may include, for example, gold, silver, copper, aluminum or a combination thereof, but the present disclosure is not limited thereto. The white ink may include, for example, white polyimide, resin, or a combination thereof, but the present disclosure is not limited thereto. In addition, the reflective element 5 may include a single-layer or multi-layer reflective film sheet.

Figure 2B:
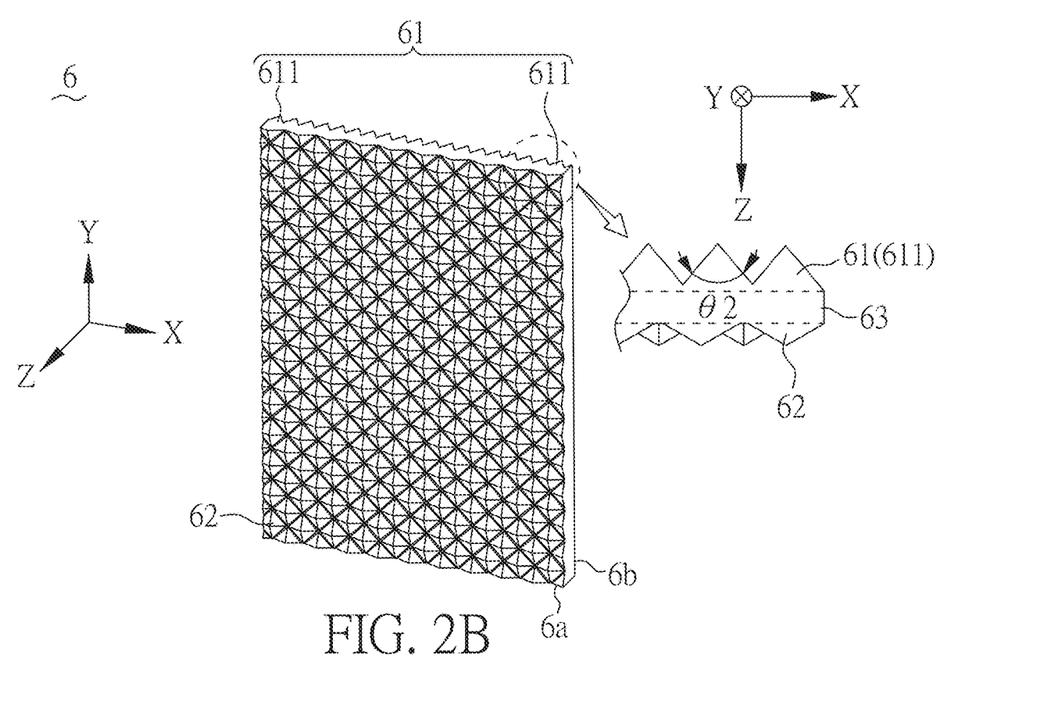
FIG. 2B is a schematic diagram of a second optical film according to an embodiment of the present disclosure.
Figure 2C:
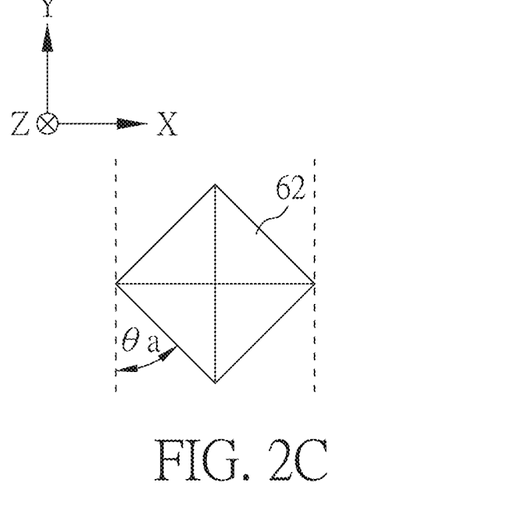
FIG. 2C and FIG. 2D are schematic diagrams illustrating a portion of the second optical film according to an embodiment of the present disclosure.
Figure 2D:
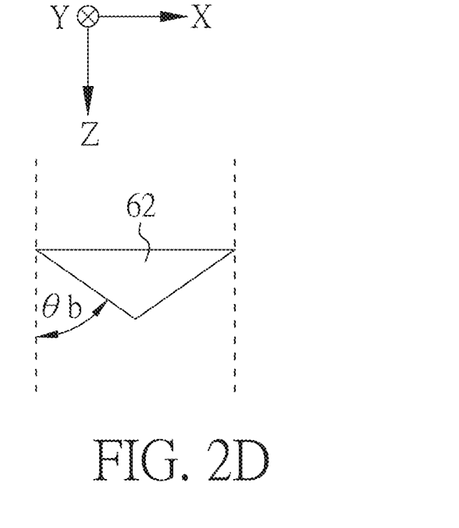

FIG. 2B is a schematic diagram of a second optical film according to an embodiment of the present disclosure, and FIG. 2C and FIG. 2D are schematic diagrams illustrating a portion of the second optical film according to an embodiment of the present disclosure.

In one embodiment of the present disclosure, as shown in FIG. 1A, FIG. 1B and FIG. 2B, the backlight module may include a second optical film 6 disposed between the first optical film 4 and the back plate 1, wherein the second optical film 6 has a second prism structure 61. In more detail, the second optical film 6 includes a second upper surface 6a and a second lower surface 6b opposite to the second upper surface 6a, wherein the second upper surface 6a is farther away from the back plate 1 than the second lower surface 6b (or the second upper surface 6a is closer to the first optical film 4 than the second lower surface 6b), and the second lower surface 6b has a second prism structure 61. The extending direction of the second prism structure 61 may be, for example, perpendicular to the first direction X. More specifically, the second prism structure 61 may have a plurality of second strip structures 611, and the plurality of second strip structures 611 may be arranged along the first direction X. The "extending direction of the second prism structure 61" refers to the extending direction of the second strip structure 611 (for example, the second direction Y). The "perpendicular" means that the included angle between the extending direction of the second prism structure 61 and the first direction X may be 80 degrees to 100 degrees (80°≤included angle≤100°). In one embodiment of the present disclosure, the included angle between the extending direction of the second prism structure 61 and the extending direction of the first prism structure 41 may be 0 degrees to 20 degrees (0°≤included angle≤20°). In one embodiment of the present disclosure, the second prism structure 61 has a second vertex angle θ2, and the second vertex angle θ2 may be 80 degrees to 120 degrees (80°≤θ2≤120°). For example, the second vertex angle θ2 may be 80°, 90°, 100°, 110°, 120°, or any value between the aforementioned values or a range of values consisting of any values thereof.

In one embodiment of the present disclosure, as shown in FIG. 1B and FIG. 2B, the second upper surface 6a of the second optical film 6 may have a plurality of micro-structures 62. The micro-structures 62 have the effect of regulating light or increasing the amount of light output of the backlight module, thereby improving the light output efficiency of the backlight module. In one embodiment of the present disclosure, the micro-structures 62 may be formed by a plurality of pyramid units arranged repeatedly, for example, in an array, but the present disclosure is not limited thereto. In one embodiment of the present disclosure, as shown in FIG. 2C and FIG. 2D, FIG. 2C shows the projection of the micro-structure 62 in the normal direction Z of the backlight module (for example, the projection on the X-Y plane), and FIG. 2D shows the projection of the micro-structure 62 in the second direction Y (for example, the projection on the X-Z plane). When the micro-structures 62 are a plurality of pyramid units, the angle θa between the projection of the micro-structure 62 in the normal direction Z of the backlight module and the second direction Y may be 25 degrees to 65 degrees (25°≤θa≤65°), and the angle θb between the projection of the micro-structure 62 in the second direction Y and the normal direction Z of the backlight module may be 45 degrees to 85 degrees (45°≤θb≤85°).

In one embodiment of the present disclosure, as shown in FIG. 1A and FIG. 2B, the second optical film 6 includes a substrate 63, and the second prism structure 61 is disposed on the substrate 63 and faces the back plate 1. The micro-structures 62 are disposed on the substrate 63 and face the first optical film 4. The second prism structure 61 facing the back plate 1 refers to that the second prism structure 61 is closer to the back plate 1 than the substrate 63, and the micro-structures 62 facing the first optical film 4 refers to that the micro-structures 62 are closer to the first optical film 4 than the substrate 63. In another embodiment of the present disclosure (not shown), similar to the structure of FIG. 1A, the second optical film 6 may be, for example, a diffuser, and thus the second prism structure 61 and the micro-structures 62 may not be provided on the substrate 63, but the present disclosure is not limited thereto.

In the present disclosure, the second optical film 6 may be prepared using the same or different materials as the first optical film 4, and the material of the second optical film 6 is as described for the first optical film 4 so that a detailed description is deemed unnecessary. In addition, the same or different materials may be used to prepare the second prism structure 61, the micro-structures 62 and the substrate 63 of the second optical film 6, respectively. Therefore, in one embodiment of the present disclosure, when the same materials are used to prepare the second prism 61, the micro-structures 62 and the substrate 63 of the second optical film 6, the second optical film 6 may be integrally formed, but the present disclosure is not limited thereto.

Figure 2E:
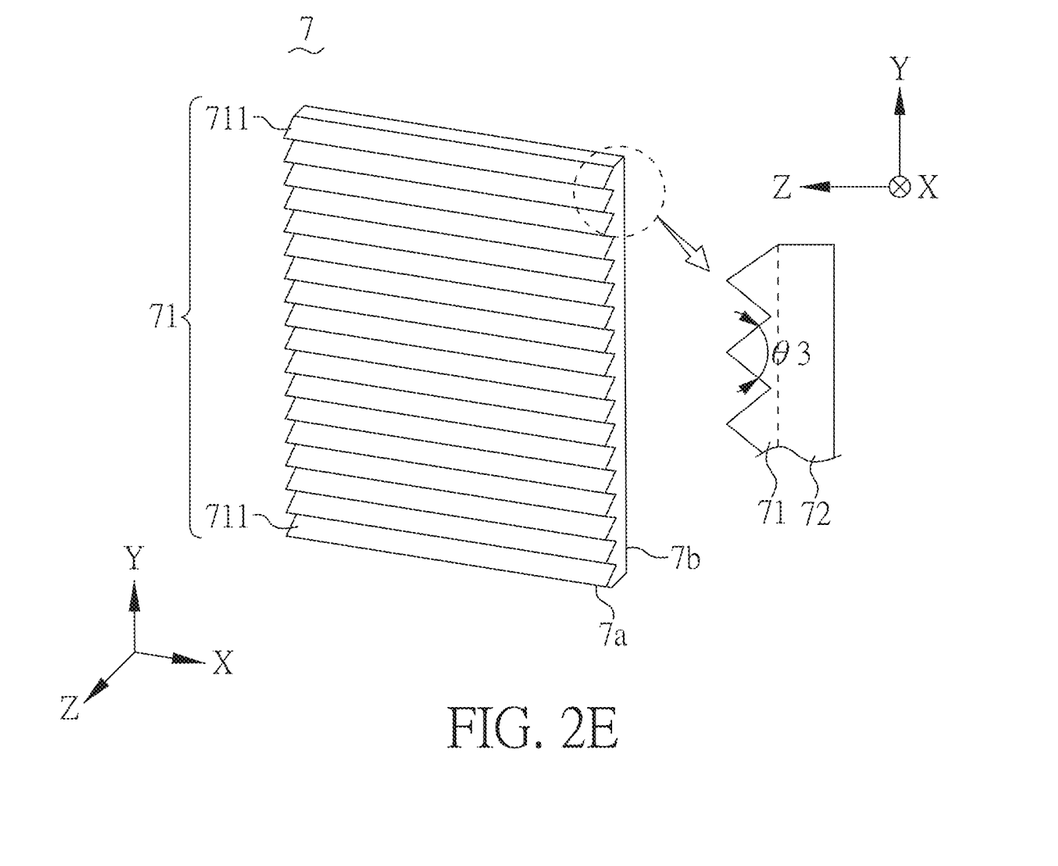
FIG. 2E is a schematic diagram of a third optical film according to an embodiment of the present disclosure.

FIG. 2E is a schematic diagram of a third optical film according to an embodiment of the present disclosure.

In one embodiment of the present disclosure, as shown in FIG. 1A, FIG. 1B and FIG. 2E, the backlight module may optionally include a third optical film 7, which is disposed between the first optical film 4 and the back plate 1 (for example, disposed between the first optical film 4 and the second optical film 6), and the third optical film 7 has a third prism structure 71. In more detail, the third optical film 7 includes a third upper surface 7a and a third lower surface 7b opposite to the third upper surface 7a, wherein the third upper surface 7a is further away from the back plate 1 than the third lower surface 7b (or the third upper surface 7a is closer to the first optical film 4 than the third lower surface 7b), and the third upper surface 7a has a third prism structure 71. The extending direction of the third prism structure 71 may be, for example, parallel to the first direction X. More specifically, the third prism structure 71 may have a plurality of third strip structures 711, and the plurality of third strip structures 711 may be arranged along the second direction Y perpendicular to the first direction X. The "extending direction of the third prism structure 71" refers to the extending direction of the third strip structure 711 (for example, the first direction X). The "parallel" refers to that the included angle between the extending direction of the prism structure and the first direction X may be 0 degrees to 20 degrees (0°≤included angle≤20°). The "perpendicular" refers to that the included angle between the first direction X and the second direction Y may be 80 degrees to 100 degrees (80°≤included angle≤100°). In one embodiment of the present disclosure, the included angle between the extending direction of the third prism structure 71 and the extending direction of the first prism structure 41 may be 80 degrees to 100 degrees (80°≤included angle≤100°). In one embodiment of the present disclosure, the third prism structure 71 has a third vertex angle θ3, and the third vertex angle θ3 may be 70 degrees to 110 degrees (70°≤θ3≤110°). For example, the third vertex angle θ3 may be 70°, 80°, 90°, 100°, 110°, or any value between the aforementioned values or a range of values consisting of any values thereof.

In one embodiment of the present disclosure, as shown in FIG. 1A and FIG. 2E, the third optical film 7 includes a substrate 72, and the third prism structure 71 is disposed on the substrate 72. The substrate 72 may have a single-layer film or multi-layer film structure design. In the present disclosure, the third optical film 7 may be prepared using the same or different materials as the first optical film 4 and/or the second optical film 6, and the material of the third optical film 7 is as described for the first optical film 4 so that a detailed description is deemed unnecessary. In addition, the same or different materials may be used to prepare the third prism structure 71 and the substrate 72 of the third optical film 7, respectively. Therefore, in one embodiment of the disclosure, when the third prism structure 71 and the substrate 72 of the third optical film 7 are made of the same material, the third optical film 7 may be integrally formed, but the present disclosure is not limited thereto.

In addition, in the present disclosure, the first optical film 4, the second optical film 6 and the third optical film 7 may each have or not have haze. The sum of the hazes of the first optical film 4, the second optical film 6 and the third optical film 7 may be 100% to 160%. In one embodiment of the present disclosure, the first optical film 4, the second optical film 6 and the third optical film 7 may each include a substrate (such as the substrate 42, the substrate 63 and the substrate 72) and a corresponding prism structure (such as the first prism structure 41, the second prism structure 61, and the third prism structure 71), and the haze of the optical film may be achieved by subjecting the substrate and/or prism structure to a stenciling process, a sandblasting process, or other suitable processes, but the present disclosure is not limited thereto. In one embodiment of the present disclosure, the haze of the optical film may be obtained by performing hard coating on the substrate and/or applying diffusion particles to the material of the prism structure, but the present disclosure is not limited thereto.

Figure 3:
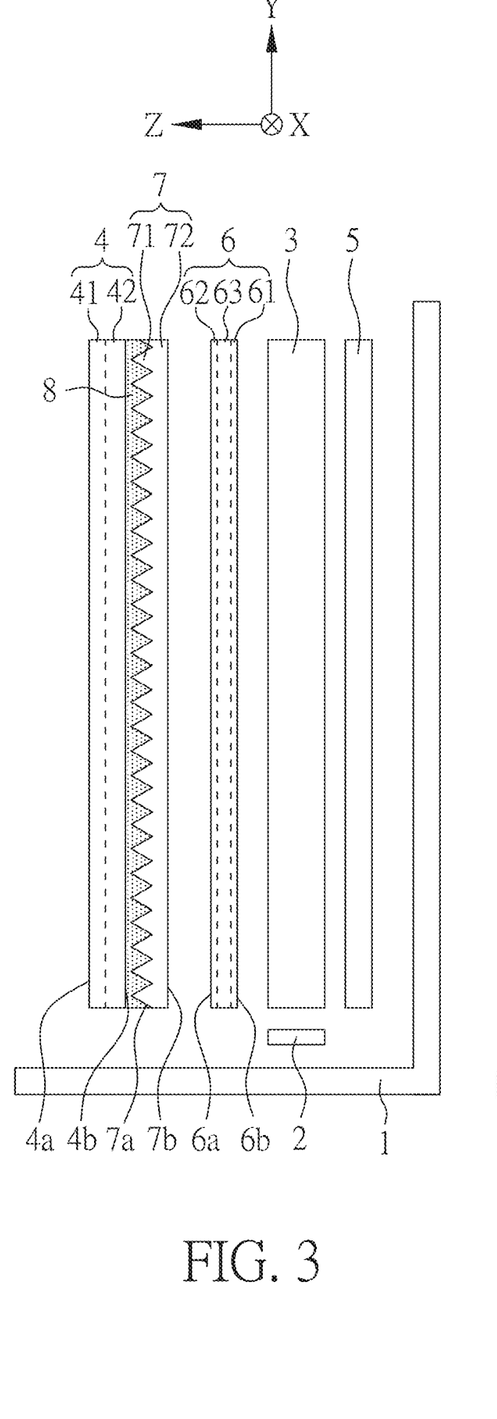
FIG. 3 is a schematic cross-sectional view of a backlight module according to an embodiment of the present disclosure.

FIG. 3 is a schematic cross-sectional view of a backlight module according to an embodiment of the present disclosure, wherein the backlight module of FIG. 3 is similar to that of FIG. 1A except for the following differences.

In one embodiment of the present disclosure, as shown in FIG. 3, the backlight module may further include an adhesive layer 8 disposed between the first optical film 4 and the third optical film 7. In more detail, the adhesive layer 8 may be in contact with the first lower surface 4b of the first optical film 4 and the third upper surface 7a of the third optical film 7, thereby bonding the first optical film 4 and the third optical film 7 to each other to form an optical film set, so as to reduce the relative position deviation between optical films, improve the assembly yield of the backlight module, or simplify the process steps. In addition, in another embodiment of the present disclosure, although not shown in the figure, the adhesive layer 8 may be disposed between the second optical film 6 and the third optical film 7 so that the second optical film 6 and the third optical film 7 are bonded to each other through the adhesive layer 8 to form another optical film set. In another embodiment of the present disclosure (not shown), similar to the structure of FIG. 3, the second optical film 6 may be, for example, a diffuser, so that the second prism structure 61 and the micro-structures 62 may not be provided on the substrate 63, but the present disclosure is not limited thereto.

In one embodiment of the present disclosure, the adhesive layer 8 may include light curing glue, heat curing glue, photo-thermal curing glue, moisture curing glue, tape, other suitable materials or a combination of the above, but the present disclosure is not limited thereto. In one embodiment of the present disclosure, the material of the adhesive layer 8 may include polyvinyl butyral (PVB), ethylene vinyl acetate (EVA), thermoplastic polyurethane (TPU), optical clear adhesive (OCA), optical clear resin (OCR), other suitable materials or a combination of the above, but the present disclosure is not limited thereto.

In this embodiment, the characteristics of the first optical film 4, the second optical film 6, the third optical film 7 and other components are as described above and thus a detailed description is deemed unnecessary.

Figure 4:
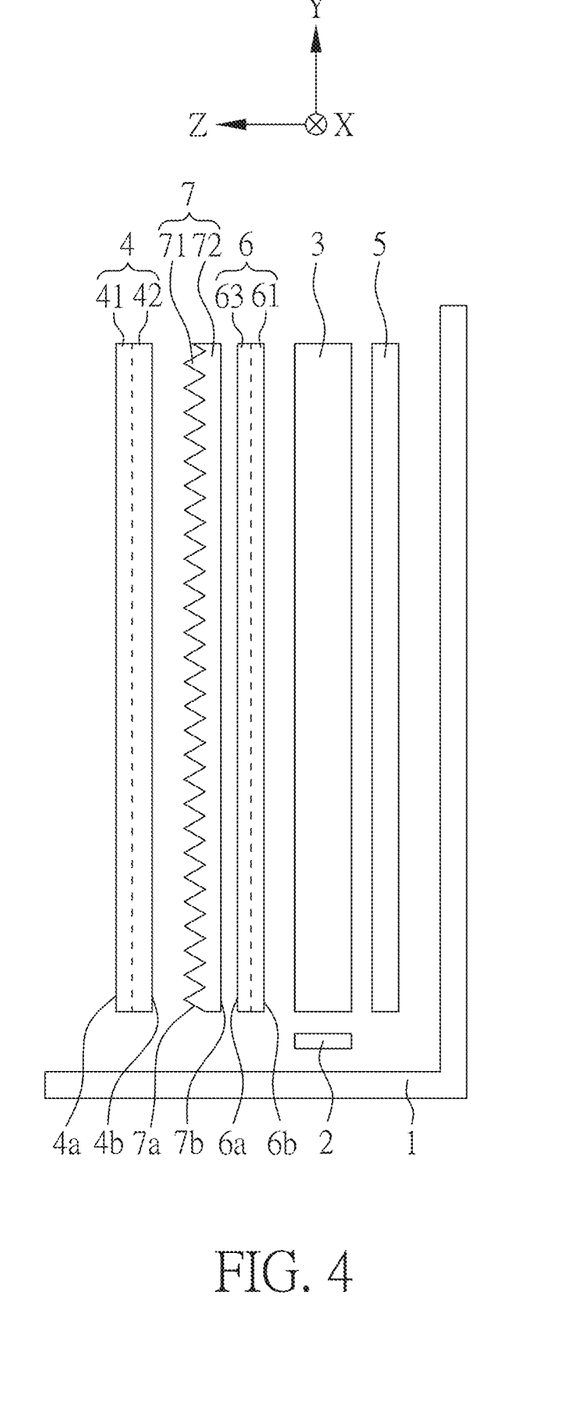
FIG. 4 is a schematic cross-sectional view of a backlight module according to an embodiment of the present disclosure.

FIG. 4 is a schematic cross-sectional view of a backlight module according to an embodiment of the present disclosure, wherein the backlight module of FIG. 4 is similar to that of FIG. 1A except for the following differences.

In one embodiment of the present disclosure, as shown in FIG. 4, the second optical film 6 of the backlight module may have a second prism structure 61, but not have micro-structures 62 (as shown in FIG. 2B), wherein the second prism structure 61 is disposed on the substrate 63. In more detail, the second optical film 6 includes a second upper surface 6a and a second lower surface 6b opposite to the second upper surface 6a, wherein the second upper surface 6a is farther away from the back plate 1 than the second lower surface 6b (or the second upper surface 6a is closer to the first optical film 4 than the second lower surface 6b), and the second lower surface 6b has a second prism structure 61. The second upper surface 6a may be a plane, without having the micro-structures 62 shown in FIG. 2B. In another embodiment of the present disclosure, similar to the structure of FIG. 4 (not shown), the second optical film 6 may be, for example, a diffuser, so that the second prism structure 61 may not be provided on the substrate 63, but the present disclosure is not limited thereto.

In this embodiment, in addition to some differences in the second optical film 6, the characteristics of the first optical film 4, the second optical film 6, the third optical film 7 and other components are as described above, and thus a detailed description is deemed unnecessary.

Figure 5:
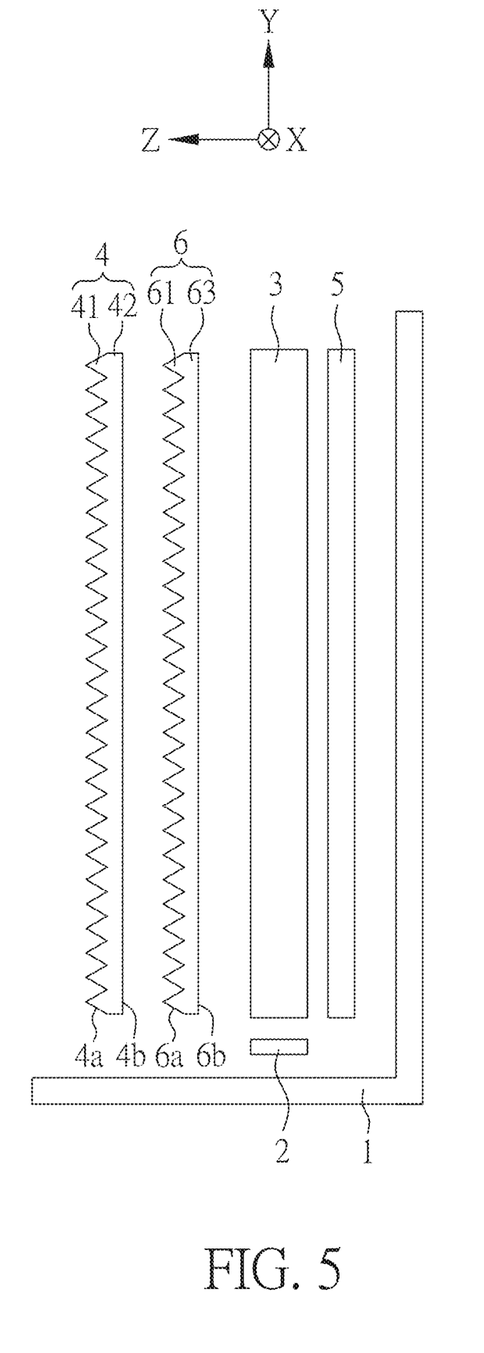
FIG. 5 is a schematic cross-sectional view of a backlight module according to an embodiment of the present disclosure.

FIG. 5 is a schematic cross-sectional view of a backlight module according to an embodiment of the present disclosure, wherein the backlight module of FIG. 5 is similar to that of FIG. 1A except for the following differences.

In one embodiment of the present disclosure, as shown in FIG. 5, the backlight module may include: a first optical film 4, disposed on the back plate 1; and a second optical film 6, disposed between the first optical film 4 and back plate 1. The first optical film 4 includes a first upper surface 4a and a first lower surface 4b opposite to the first upper surface 4a, wherein the first upper surface 4a is farther away from the back plate 1 (for example, farther away from the side of the back plate 1 parallel to the surface of the first optical film 4) than the first lower surface 4b, and the first upper surface 4a has a first prism structure 41. The extending direction of the first prism structure 41 may be parallel to the first direction X, for example. The second optical film 6 includes a second upper surface 6a and a second lower surface 6b opposite to the second upper surface 6a, wherein the second upper surface 6a is farther away from the back plate 1 than the second lower surface 6b (or the second upper surface 6b is closer to the first optical film 4 than the second lower surface 6b), and the second upper surface 6a has a second prism structure 61. The extending direction of the second prism structure 61 may be parallel to the first direction X, for example. The "parallel" refers to that the included angle between the extending direction of the prism structure and the first direction X may be 0 degrees to 20 degrees (0°≤included angle≤20°). In one embodiment of the present disclosure, the included angle between the extending direction of the second prism structure 61 and the extending direction of the first prism structure 41 may be 0 degrees to 20 degrees (0°≤included angle≤20°). In one embodiment of the present disclosure, the second prism structure 61 may be disposed on the substrate 63, and the second lower surface 6b of the second optical film 6 may be a plane.

In this embodiment, the backlight module may not be provided with the third optical film 7 (for example, as shown in FIG. 1A), so that the thickness of the backlight module may be reduced. In addition, except for some differences between the first optical film 4 and the second optical film 6 mentioned above, the characteristics of the first optical film 4, the second optical film 6 and other components are as described above and thus a detailed description is deemed unnecessary.

Figure 6:
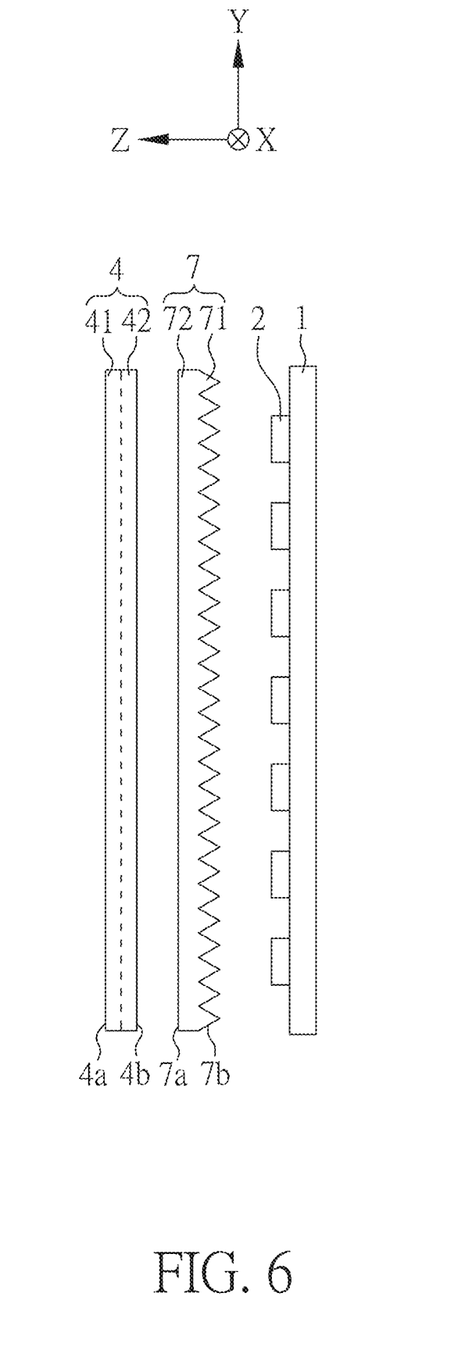
FIG. 6 is a schematic cross-sectional view of a backlight module according to an embodiment of the present disclosure.

FIG. 6 is a schematic cross-sectional view of a backlight module according to an embodiment of the present disclosure, wherein the backlight module of FIG. 6 is similar to that of FIG. 1A except for the following differences.

In one embodiment of the present disclosure, as shown in FIG. 6, the backlight module may be a direct-type backlight module. In more detail, the backlight module may include: a back plate 1; a light source 2 disposed on the back plate 1; a first optical film 4 disposed on the back plate 1; and a third optical film 7 disposed between the first optical film 4 and the back plate 1.

In one embodiment of the present disclosure, as shown in FIG. 6, the first optical film 4 includes a first upper surface 4a and a first lower surface 4b opposite to the first upper surface 4a, wherein the first upper surface 4a is farther away from the back plate 1 than the first lower surface 4b, and the first upper surface 4a has a first prism structure 41. The extending direction of the first prism structure 41 may be perpendicular to the first direction X, for example. The third optical film 7 includes a third upper surface 7a and a third lower surface 7b opposite to the third upper surface 7a. The third upper surface 7a is further away from the back plate 1 than the third lower surface 7b, and the third lower surface 7a is further away from the back plate 1 than the third lower surface 7b. The third lower surface 7b has a third prism structure 71, and the extending direction of the third prism structure 71 may be parallel to the first direction X, for example. The "perpendicular" refers to that the included angle between the extending direction of the prism structure and the first direction X may be 80 degrees to 100 degrees (80°≤included angle≤100°). The "parallel" refers to that the included angle between the extending direction of the prism structure and the first direction X may be 0 degrees to 20 degrees (0°≤included angle≤20°).

In another embodiment of the present disclosure, although not shown in the figure, the extending direction of the first prism structure 41 may be, for example, parallel to the first direction X, and the extending direction of the third prism structure 71 may be, for example, perpendicular to the first direction X. By designing the extending direction of the first prism structure 41 to be perpendicular to the extending direction of the third prism structure 71, the light output efficiency of the backlight module can be improved or the visual effect can be improved. Therefore, in one embodiment of the present disclosure, the included angle between the extending direction of the third prism structure 71 and the extending direction of the first prism structure 41 may be 80 degrees to 100 degrees (80°≤included angle≤100°).

In this embodiment, except for some differences of the third optical film 7, the characteristics of the first optical film 4, the third optical film 7 and other components are as described above, and thus a detailed description is deemed unnecessary.

The backlight module of the present disclosure may be applied to various display panels that require backlight sources to form a display device. The display panel may be, for example, a flexible display panel, a touch display panel, a curved display panel or a tiled display panel, but the present disclosure is not limited thereto. The display device may be, for example, a monitor, a mobile phone, a laptop, a video camera, a camera, a music player, a mobile navigation device, a television set, and other electronic devices that need to display images, but the present disclosure is not limited thereto.

The aforementioned specific embodiments should be construed as merely illustrative, and not limiting the rest of the present disclosure in any way.

The invention claimed is:

1. A backlight module, comprising:
a back plate;
a light source disposed on the back plate; and
a first optical film disposed on the back plate, wherein the first optical film includes a first upper surface and a first lower surface, and the first upper surface is farther away from the back plate than the first lower surface, and has a first prism structure,
wherein, at a first angle, a second angle and a third angle, the backlight module respectively has a first brightness value, a second brightness value and a third brightness value, which satisfy:

$|[(A/C)-(B/C)]\times 100\%|\geq 10\%$, where A represents the first brightness value, B represents the second brightness value, C represents the third brightness value, the third brightness value is a maximum brightness value of the backlight module, and the first angle, the second angle and the third angle are different from each other.

2. The backlight module as claimed in claim 1, wherein the first optical film includes a substrate having a multi-layer film structure, and the first prism structure is disposed on the multi-layer film structure.

3. The backlight module as claimed in claim 1, further comprising a second optical film disposed between the first optical film and the back plate, wherein the second optical film has a second prism structure, and an included angle between an extending direction of the second prism structure and an extending direction of the first prism structure is 0 to 20 degrees.

4. The backlight module as claimed in claim 3, wherein the second optical film includes a second upper surface and a second lower surface opposite to the second upper surface, the second upper surface is farther away from the back plate than the second lower surface, and the second upper surface has the second prism structure.

5. The backlight module as claimed in claim 3, wherein the second prism structure has a second vertex angle, and the second vertex angle is 80 degrees to 120 degrees.

6. The backlight module as claimed in claim 3, wherein the second optical film includes a second upper surface and a second lower surface opposite to the second upper surface, the second upper surface is farther away from the back plate than the second lower surface, and the second lower surface has the second prism structure.

7. The backlight module as claimed in claim 6, wherein the second upper surface has a plurality of micro-structures.

8. The backlight module as claimed in claim 7, wherein the micro-structures are formed by a plurality of pyramid units arranged repeatedly.

9. The backlight module as claimed in claim 7, wherein the second optical film includes a substrate, the second prism structure is disposed on the substrate and faces the back plate, and the micro-structures are disposed on the substrate and face the first optical film.

10. The backlight module as claimed in claim 6, further comprising a third optical film disposed between the first optical film and the second optical film, wherein the third optical film has a third prism structure, and an included angle between an extending direction of the third prism structure and the extending direction of the first prism structure is 80 degrees to 100 degrees.

11. The backlight module as claimed in claim 10, wherein a sum of hazes of the first optical film, the second optical film and the third optical film is 100% to 160%.

12. The backlight module as claimed in claim 10, wherein the third optical film includes a substrate, and the third prism structure is disposed on the substrate.

13. The backlight module as claimed in claim 1, further comprising a third optical film disposed between the first optical film and the backplane, wherein the third optical film has a third prism structure, and an included angle between an extending direction of the third prism structure and an extending direction of the first prism structure is 80 degrees 14 to 100 degrees.

14. The backlight module as claimed in claim 13, wherein the third optical film includes a third upper surface and a third lower surface opposite to the third upper surface, the third upper surface is farther away from the back plate than the third lower surface, and the third upper surface has the third prism structure.

15. The backlight module as claimed in claim 13, further comprising an adhesive layer disposed between the first optical film and the third optical film.

16. The backlight module as claimed in claim 13, wherein the third optical film includes a third upper surface and a third lower surface opposite to the third upper surface, the third upper surface is farther away from the back plate than the third lower surface, and the third lower surface has the third prism structure.

17. The backlight module as claimed in claim 13, wherein the third prism structure has a third vertex angle, and the third vertex angle is 70 degrees to 110 degrees.

18. The backlight module as claimed in claim 1, wherein the first prism structure has a first vertex angle, and the first vertex angle is 70 degrees to 110 degrees.

19. The backlight module as claimed in claim 1, further comprising a light guide plate disposed on the back plate and disposed opposite to the light source.

20. The backlight module as claimed in claim 19, further comprising a reflective element disposed on the back plate and disposed between the light guide plate and the back plate.

* * * * *